Jan. 2, 1923.
J. A. DAUGHTERY.
WHEEL AND AXLE ASSEMBLY.
FILED APR. 1, 1922.
1,440,818.
2 SHEETS—SHEET 1.
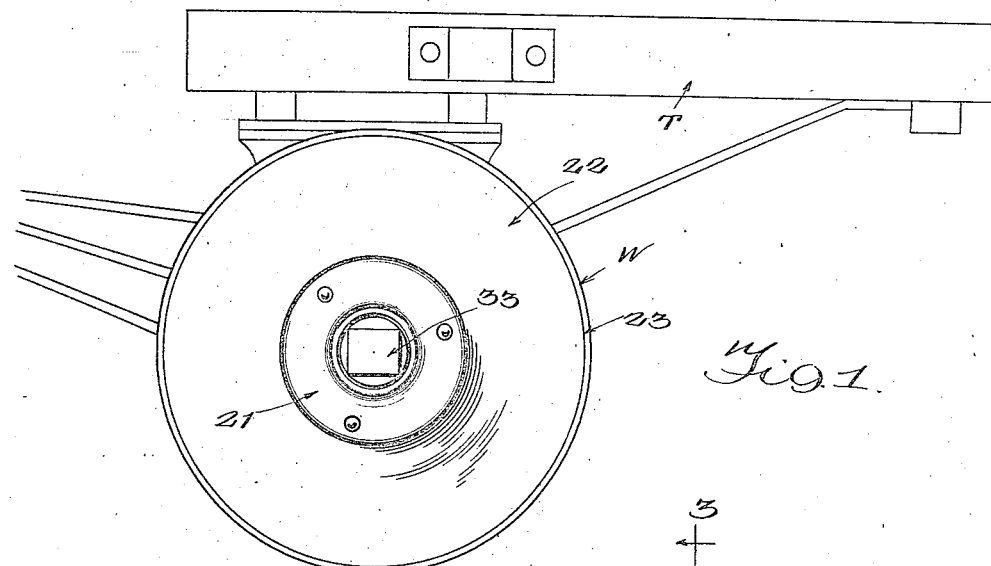
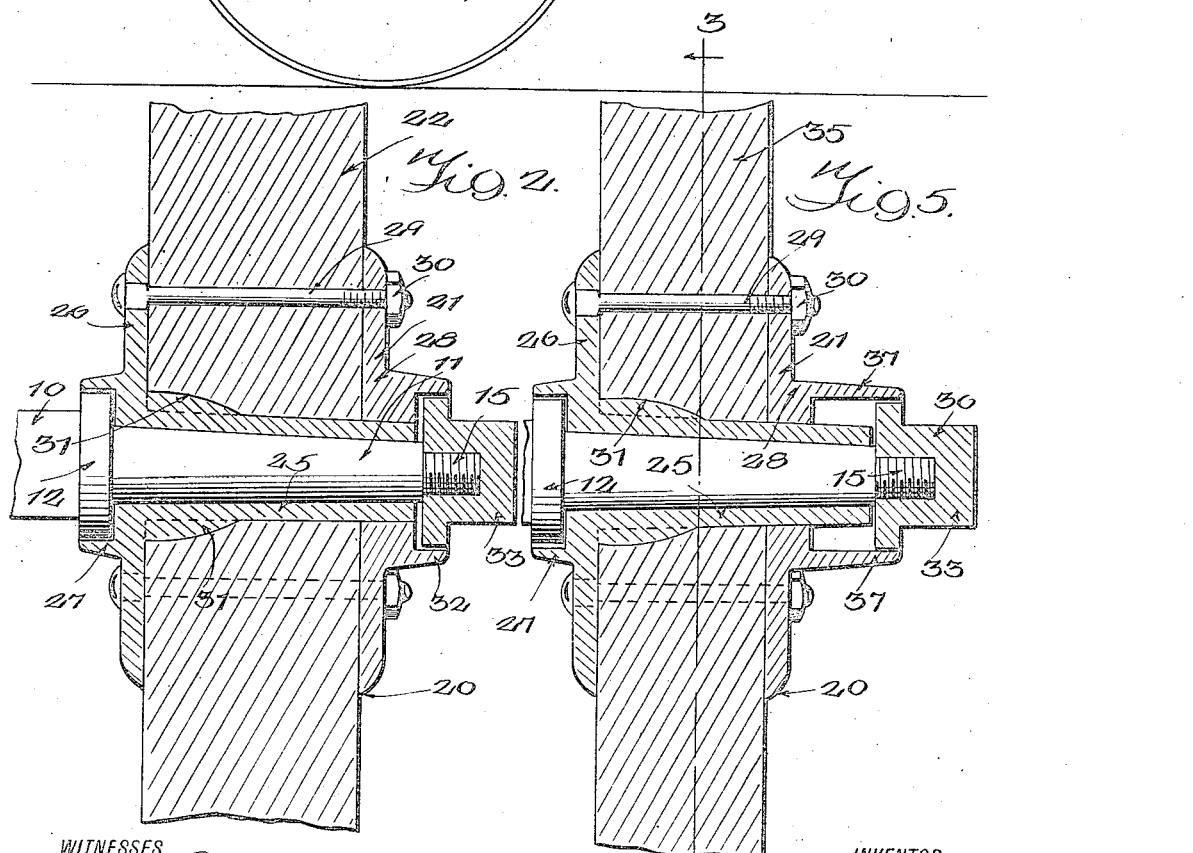
WITNESSES
George C. Styer
W. F. Buckley
INVENTOR
J. A. DAUGHTERY,
BY
Munn & Co.
ATTORNEYS Jan. 2, 1923.

J. A. DAUGHTERY.
WHEEL AND AXLE ASSEMBLY.
FILED APR. 1, 1922.

WITNESSES

INVENTOR
J. A. DAUGHTERY

BY

ATTORNEYS

Patented Jan. 2, 1923.

1,440,818

UNITED STATES PATENT OFFICE.

JOHN A. DAUGHTERY, OF GOLDSBORO, NORTH CAROLINA, ASSIGNOR OF ONE-HALF TO HERMAN F. HARDY, OF GOLDSBORO, NORTH CAROLINA.

WHEEL AND AXLE ASSEMBLY.

Application filed April 1, 1922. Serial No. 548,591.

*To all whom it may concern:*

Be it known that I, JOHN A. DAUGHTERY, a citizen of the United States, and a resident of Goldsboro, in the county of Wayne and State of North Carolina, have invented certain new and useful Improvements in Wheel and Axle Assemblies, of which the following is a specification.

This invention relates to an improvement in wheel and axle assemblies especially adapted for use on trucks, such as tobacco trucks and the like.

The object of the invention is to provide a wheel and axle assembly of this character which is dust proof and which may be readily and easily constructed and yet at the same time when constructed is highly organized and reliable and durable in use.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1 is a fragmentary view in elevation of the truck to which a wheel and axle embodying the present invention are applied;

Figure 2 is a view in longitudinal vertical section, illustrating one embodiment of the invention;

Figure 5 is a view similar to Figure 2, showing a slightly modified form of construction.

Figure 3:
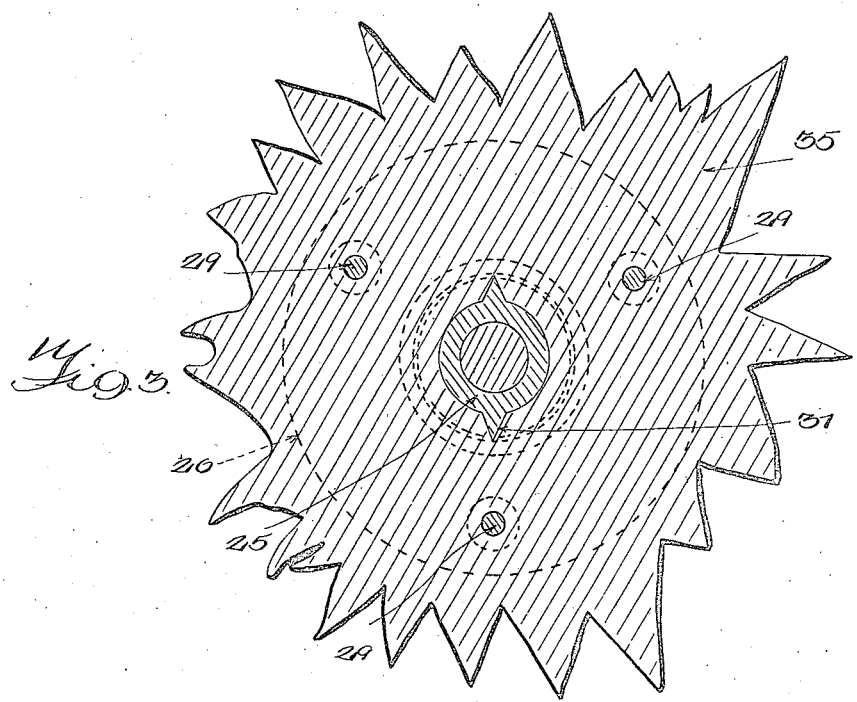
Figure 3 is a view in transverse vertical section, taken approximately on line 3—3 of Figure 5.

Referring to the drawings wherein for the sake of illustration is shown the preferred embodiment of the invention, the reference character T designates a tobacco truck or similar truck, to which the wheel and axle assembly constituting the present invention and designated at W is applied.

Figure 4:
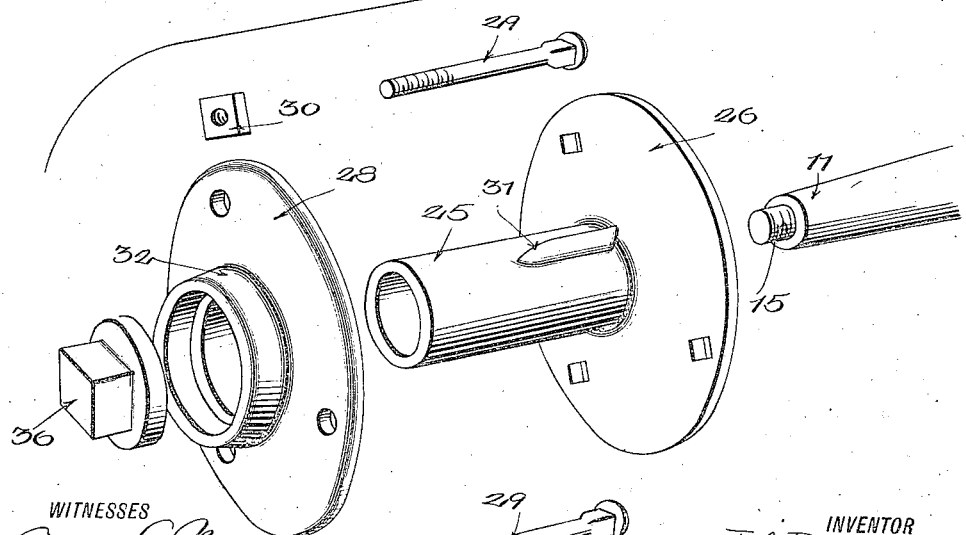
Figure 4 is a group view in perspective, illustrating certain parts of the invention prior to assembly.

Referring now especially to Figures 1 to 4, inclusive, it will be seen that the wheel and axle assembly comprises an axle 10 constructed of steel and having at each end a spindle 11, a collar 12 being provided between the spindle and the axle, as shown in Figure 2. The outer end of the spindle is formed with a reduced and threaded extension 15 for a purpose which will presently appear.

A wheel designated generally at 20 is rotatably mounted upon each spindle 11 and in general the wheel comprises a hub 21, a body portion comprising a solid block of wood and designated at 22 and a steel tire indicated at 23 which is electrically welded and shrunk directly on the body portion 22 of the wheel.

The hub 21 is preferably constructed entirely of cast iron and includes a tubular body portion 25 rotatably mounted on the spindle 11 and having its outer periphery tapered, as shown in the drawings. A cheek plate 26 is integrally formed with the tubular body portion 25 at the end thereof adjacent the axle 10, and upon the outer face of the cheek plate an annular flange 27 is provided and extends about and completely encloses the collar 12 preventing ingress of dust and foreign matter at this end of the axle.

A removable cheek plate 28 is fitted on the end of the body portion 25 of the hub and is disposed adjacent the reduced extension 15 of the spindle. As clearly shown in Figure 2 the cheek plates 26 and 28 abut the opposite faces of the body portion 22 of the wheel and together with carriage bolts 29 and nuts 30 serve to secure this body portion to the hub, the bolts 29 extending through bolt holes provided therefor in the cheek plates and in the body portion 22 of the wheel. The strain imposed upon the bolts 29 and upon the portions of the body portion 22 of the wooden wheel which coacts with these bolts is at times very severe, and to preclude break-down or injury to these elements, a number of key ribs 31 are integrally formed with the body portion 25 of the hub and are driven into the wooden body portion 22 of the wheel thus firmly locking the body portion to the hub and supplementing the action of the bolts 29 and 30 and preventing injury as described.

The cheek plate 28 is provided with an outwardly extendng annular flange 32 which extends about a flanged nut 33 threaded on the reduced extension 15 of the spindle to complete the wheel and axle assembly. The flanged nut together with the annular flange 32 prevent ingress of dust from this end of the wheel and thus make the wheel entirely dust proof. As shown in Figure 2 the flanged nut is adapted to abut not only the end of the body portion 25 of the hub but also the adjacent surface of the cheek plate 28. In certain types of wheels however the wooden body portion of the wheel is somewhat thinner than shown in Figure 2 and takes the form shown in Figure 5 wherein such body portion is designated at 35. With such wheels the wheel and axle assembly is identical with the construction shown in Figures 1 and 4 and above described except that the flanged nut indicated in Figure 5 at 36 does not abut the cheek plate but is adapted only to abut the end of the body portion of the hub and that the annular flange which embraces the nut 36 is made longer, as indicated at 37 in Figure 5. As the invention in all other respects is identical with the invention shown in Figure 4, the description applied to the other parts thereof applies equally with the showing in Figure 5.

With this construction the wheel is not only dust proof but it may be readily and easily assembled or disassembled. Obviously, it may be conveniently manufactured from materials readily obtainable and with facilities already in use. When applied to the truck it is not only strong and durable but also easy running and well adapted to serve in this capacity.

I claim:

In a wheel and axle assembly, the combination with an axle having a tapered spindle and a collar between the spindle and the axle, a wheel rotatably mounted on the spindle of the axle and including a hub comprising a tapered body porton, a cheek plate integral with one end of said body portion and having an annular flange embracing and entirely surrounding the periphery of the collar, a cheek plate slidably and removably fitted on the other end of the body portion, a nut having threaded connection with the spindle and coacting with the cheek plate and body portion of the hub to retain the wheel on the spindle, said wheel having a solid wooden body portion carried by said hub, the cheek plates of said hub abutting the opposite sides of said wooden body portion, bolts and nuts coacting with said cheek plates and said wooden body portion, and tapered key ribs integrally formed with the hub and integral cheek plate and engaging the wooden body portion of the wheel, said tapered key ribs merging into the hub at a point spaced a substantial distance from the outer end thereof to facilitate assembly of the body portion of the wheel on the hub and yet rigidly holding the same in assembled position.

JOHN A. DAUGHTERY.